US010863211B1

(12) United States Patent
Wu et al.

(10) Patent No.: US 10,863,211 B1
(45) Date of Patent: Dec. 8, 2020

(54) MANIFEST DATA FOR SERVER-SIDE MEDIA FRAGMENT INSERTION

(71) Applicant: Amazon Technologies, Inc., Seattle, WA (US)

(72) Inventors: Yongjun Wu, Bellevue, WA (US); Tarun Jindal, Seattle, CA (US); Kyle Woo, Kent, WA (US); Rakesh Tangirala, Redmond, WA (US); Manish Rao, Seattle, WA (US); Sitaraman Ganapathy, Issaquah, WA (US); Mairo Pedrini, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

(21) Appl. No.: 16/186,927

(22) Filed: Nov. 12, 2018

(51) Int. Cl.
*H04N 21/234* (2011.01)
*H04N 21/258* (2011.01)
*H04N 21/236* (2011.01)
*H04N 21/2665* (2011.01)
*H04L 29/08* (2006.01)

(52) U.S. Cl.
CPC ..... *H04N 21/23424* (2013.01); *H04N 21/236* (2013.01); *H04N 21/25833* (2013.01); *H04N 21/2665* (2013.01); *H04L 67/02* (2013.01)

(58) Field of Classification Search
CPC ......... H04N 21/23424; H04N 21/2343; H04N 21/234363; H04N 21/25825; H04N 21/25833
See application file for complete search history.

(56) References Cited

U.S. PATENT DOCUMENTS

| 10,045,053 | B1* | 8/2018 | Wu | H04N 21/25808 |
| 2006/0059192 | A1* | 3/2006 | Chun | G11B 27/11 |
| 2011/0072073 | A1* | 3/2011 | Curtis | H04L 67/1002 709/203 |
| 2011/0082945 | A1* | 4/2011 | Myers | H04N 21/234327 709/231 |
| 2012/0197419 | A1* | 8/2012 | Dhruv | H04N 21/8455 700/94 |
| 2012/0259946 | A1* | 10/2012 | Stockhammer | H04N 21/8456 709/217 |
| 2013/0091251 | A1* | 4/2013 | Walker | H04N 21/23424 709/219 |
| 2013/0117120 | A1* | 5/2013 | Shafiee | H04N 21/812 705/14.58 |
| 2014/0026052 | A1* | 1/2014 | Thorwirth | H04L 65/4084 715/721 |
| 2014/0149210 | A1* | 5/2014 | Ma | H04N 21/26603 705/14.49 |

(Continued)

*Primary Examiner* — Pankaj Kumar
*Assistant Examiner* — Timothy R Newlin
(74) *Attorney, Agent, or Firm* — Weaver Austin Villeneuve & Sampson LLP

(57) ABSTRACT

Methods and apparatus are described for providing media presentations that include content originating from multiple sources. Techniques disclosed include server-side logic for inserting secondary content, such as advertisements, into primary content, such as a VOD presentation. Systems implementing the disclosed techniques can support different viewer device capabilities relating to displaying media presentations that include content from multiple sources.

22 Claims, 8 Drawing Sheets

(56) References Cited

U.S. PATENT DOCUMENTS

| | | | |
|---|---|---|---|
| 2014/0150019 A1* | 5/2014 | Ma | H04L 65/602 |
| | | | 725/34 |
| 2014/0229976 A1* | 8/2014 | Ma | H04N 21/8456 |
| | | | 725/32 |
| 2015/0100702 A1* | 4/2015 | Krishna | H04N 21/23439 |
| | | | 709/231 |
| 2015/0256581 A1* | 9/2015 | Kolhi | H04N 21/4126 |
| | | | 709/219 |
| 2015/0296274 A1* | 10/2015 | Good | H04N 21/26258 |
| | | | 725/93 |
| 2015/0382042 A1* | 12/2015 | Wagenaar | H04L 65/605 |
| | | | 725/34 |
| 2017/0142180 A1* | 5/2017 | McGowan | H04N 21/242 |
| 2017/0272485 A1* | 9/2017 | Gordon | H04L 65/601 |
| 2017/0359628 A1* | 12/2017 | Sachdev | H04N 21/8456 |
| 2019/0037252 A1* | 1/2019 | Wagenaar | H04N 21/23106 |
| 2019/0342356 A1* | 11/2019 | Thomas | H04N 21/234309 |

\* cited by examiner

MANIFEST DATA FOR SERVER-SIDE MEDIA FRAGMENT INSERTION

BACKGROUND

Media content is increasingly delivered to end user devices over data networks using an array of streaming technologies. Providers of streaming content services want to be able to support a wide range of end user devices having wide ranging capabilities and many different types and versions of media players. New streaming techniques are constantly being developed, but are often not supported by older or less capable devices or media players. So, if content service providers want to be able to provide content to such devices or players in a way that takes advantage of such new techniques, they need to be able to find ways around these limitations.

For example, a content service provider might want to provide a video-on-demand (VOD) presentation that includes content originating from more than one source, e.g., a movie with inserted ad content. However, many viewer devices may not have sufficient CPU or memory resources to support client-side ad insertion using two media players, such as one media player dedicated to movie content, and one media player dedicated to inserted ad content. Instead, such viewer devices may rely on server side techniques for inserting ad content. In certain scenarios, viewer devices capable of client-side ad insertion may still be configured to utilize server-side ad insertion to prevent ad removal.

DETAILED DESCRIPTION

Figure 1:
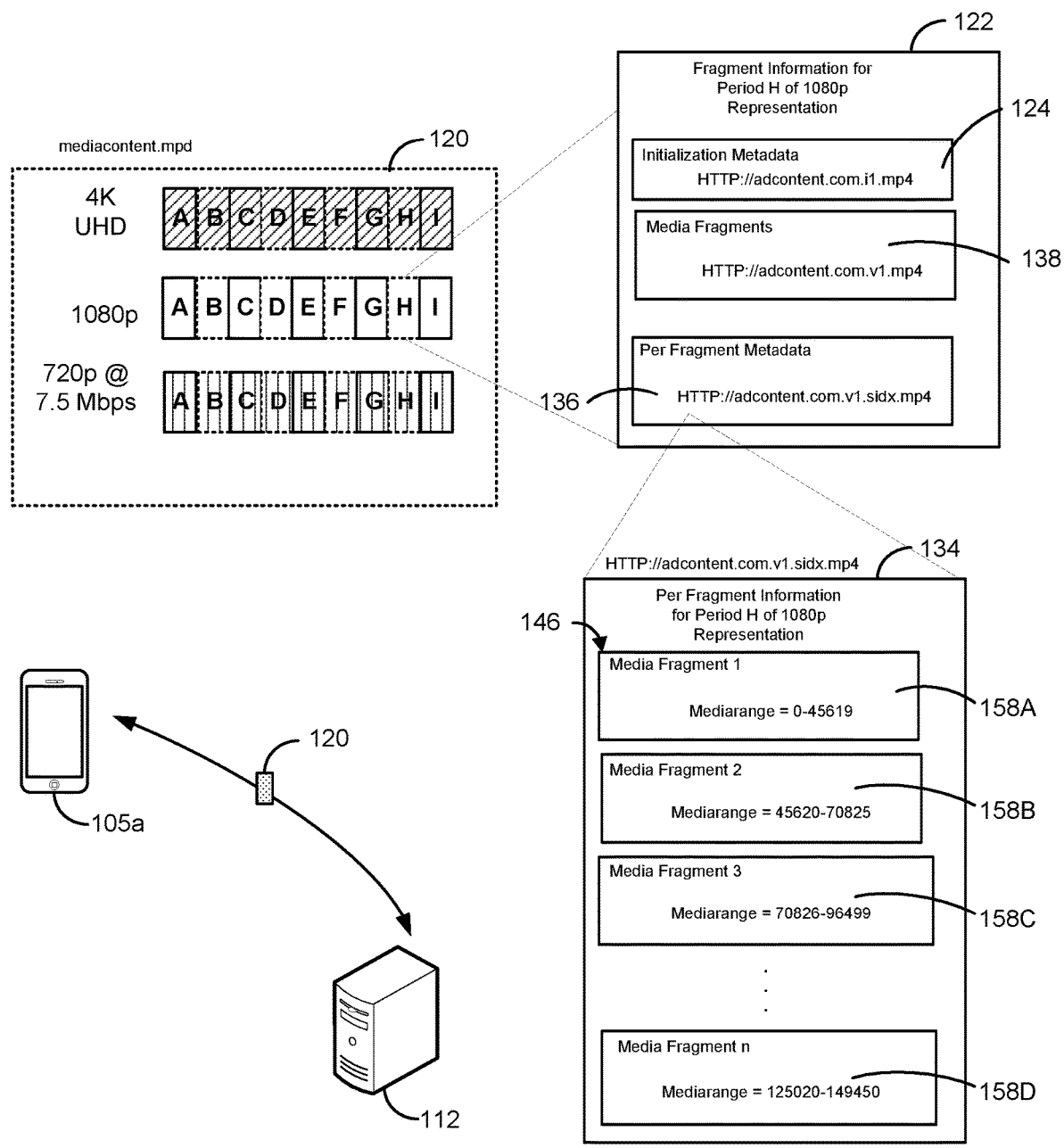
FIG. 1 illustrates an example of a computing environment in which composite manifests can be provided for media content playback.

This disclosure describes techniques for providing media presentations that include content originating from multiple sources. For example, server-side techniques for inserting secondary content, such as advertisements, into primary content, such as a VOD presentation, are described. Systems implementing the disclosed techniques can support different viewer device capabilities relating to displaying media presentations that include content from multiple sources.

For example, an older living room (LR) viewer device lacks the computing resources to perform client-side ad insertion, and/or cannot parse composite manifest data with multiple time periods that include periods of primary content and periods of secondary content. The older device relies on stitched manifest data that enables server-side insertion of secondary content into primary content in ways that are effectively transparent to the viewer devices (e.g., URL keys identifying interstitial periods decoded by a light function (LF) on an edge server). The sources of media content are configured such that media content fragments for playback (e.g., audio fragments or video fragments) are at a zero offset within a particular content source (e.g., content file). For example, an ad content source is generated without or stripped of initialization metadata and per fragment metadata such that a video fragment begins with a byte offset of zero within the ad content source. This allows the stitched manifest data to provide a smooth playback transition, such as, for example, between the primary content retrieved from a main content source and the secondary content retrieved from the ad content source. Information such as the per fragment metadata is embedded within the stitched manifest data itself to allow the LR viewer device to generate fragment requests for primary content or secondary content.

In some implementations, stitched manifest data requires ad content to have identical video encoding parameters as the main content being played back. For example, stitched manifest data utilizes logic involving fetching an ad from an ad server (e.g., using VMAP/VAST), transcoding the fetched ad using an encoding pipeline into multiple copies (e.g., 5 video frame rates×2 different resolutions×8 different aspect ratios per resolution results in approximately 80 copies), and inserting the correct version into the primary content in the VOD presentation. Furthermore, stitched manifest data requires media timeline alignment logic to maintain audio and video synchronization, such as, for example, due to the slight time duration difference between audio and video fragments.

In contrast, certain devices can parse composite manifest data with multiple time periods that define distinct periods of primary content and periods of secondary content. In some scenarios, the different periods specified in composite manifest data can use different video encoding parameters (e.g., ad content can be augmented with four black boxes along the borders to compensate for aspect ratio differences from main content), and/or additional timing information in the composite manifest data describing the different periods provide greater flexibility in maintaining audio and video synchronization. Per fragment metadata can be excluded from the composite manifest data, which in some implementations, reduces a time to first frame, manifest parsing time, and/or memory consumption. Instead, per fragment metadata is stored in a per fragment metadata source separate from the primary content source or the secondary content source.

For example, per fragment metadata is stored in a per fragment metadata file that is separate from the main content file or the ad content file. By configuring the composite manifest data to reference different sources for per fragment metadata and media content, the same media content sources, (e.g., the ad content file and the main content file) can be used for either the composite manifest data or the stitched manifest data, thereby avoiding redundant encoded content sources when supporting devices with different capabilities.

In certain implementations, the disclosed techniques enable a system that supports both viewer devices using composite manifest data and viewer devices using stitched manifest data, and allows the viewer devices with different capabilities to share the same set of encoded primary content fragments, encoded secondary content fragments, and/or the content delivery network (CDN) for delivering the content fragments and each type of manifest data.

FIG. 1 illustrates an example of a computing environment in which composite manifest data can be provided for media content playback. As shown in FIG. 1, viewer device 105a can receive manifest data such as composite manifest file 120 (which can be markup files or other types of data structures) providing playback options for media content (e.g., episode #1 of the television show Breaking Bad). In some implementations, viewer device 105a includes an additional parameter in its request for a manifest that specifies a particular type of manifest (e.g., manifest_type=baseSegment). In various implementations, the manifest request includes device capability information (e.g., device type identification (DTID)) which manifest server 112 uses to determine compatibility of a viewer device with a particular type of manifest.

Composite manifest file 120 represents manifest data that includes, for the playback periods of the media content, references to locations (e.g., a base URL) of media content fragments (e.g., video, audio, subtitles) corresponding to the different playback options. The playback periods correspond to temporal portions of a media content presentation identified in the manifest data, and are illustrated in FIG. 1 as periods A through I in composite manifest file 120. Different periods can correspond to content from different sources. For example, periods A, C, E, G, I, depicted with a solid border, correspond to primary content (e.g., the movie portion of a VOD presentation) provided by an origin server (not shown). Periods B, D, F, H, depicted with a dashed border, correspond to secondary content (e.g., trailers, advertisements, breaking news alerts, etc.) provided by a different server, such as, for example, an ad server (not shown) using the VMAP (Video Multiple Ad Playlist) and VAST (Video Ad Serving Template) protocol.

While FIG. 1 depicts periods of primary content alternating with periods of secondary content (e.g., mid-roll), the ordering of primary content and secondary content can vary. For example, the VOD presentation can begin with secondary content (e.g., a pre-roll), and/or end with secondary content (e.g., post-roll). It should be appreciated that composite manifest file 120 is not limited to specifying content from two sources. For example, each of the periods for the secondary content can be sourced from a different ad server, and/or different periods of the primary content can be sourced from different origin servers.

Composite manifest file 120 provides different playback options for media content. The playback options may differ by one or more encoding parameters such as bitrate, resolution, language, codec, etc. In the example of FIG. 1, composite manifest file 120 indicates fragments for playback of the media content at the 4K UHD, 1080p, and 720p at 5 megabits per second (Mbps) video quality levels (or bitrates).

Composite manifest file 120 includes information and/or references to information that enables viewer devices to construct appropriate URLs to access fragments of the media content. Specifically, composite manifest file 120 includes, for each playback period, for each of the different playback options, fragment information for the corresponding playback option. In FIG. 1, fragment information 122 includes fragment information for fragments in period H of secondary content for the playback option at 1080p resolution.

Fragment information 122 can include initialization metadata 124 for an initialization fragment of a media content file associated with the corresponding playback option. In some implementations, an initialization fragment will not be present where the corresponding media fragments for the playback option are self-initializing. The initialization metadata 124 identifies a location (e.g., Uniform Resource Locator (URL)) of an initialization fragment that contains metadata that can be used by devices to perform initialization for the corresponding playback option for the playback period. In certain implementations, viewer device 105a initializes a video decoder using information retrieved from the initialization fragments for the corresponding playback options.

Fragment information 122 includes fragment location information 138 for each of the fragments (or segments) of the media content for that period. The fragment location information 138 for each fragment provides a part of the information for accessing the corresponding media fragment. For example, fragment location information 138 can include a URL, such as for the MPEG-4 file, HTTP://adcontent.com.v1.mp4, indicated in FIG. 1. In a class of implementations, fragment location information 138 is represented in composite manifest file 120 using a <BaseURL> markup tag.

In some implementations, each of the fragments in fragment information 122 has the same fragment location information 138. For example, HTTP://adcontent.com.v1.mp4 is a base URL shared by each of the fragments in period H for the 1080p playback option, indicating that each of the fragments are stored at the same location (e.g., in the same file). For viewer device 105a to generate a properly formatted request for a particular fragment in period H at 1080p, additional information is required in order to generate a fragment request that specifies the particular media fragment at the location identified by fragment location information 138.

Fragment information 122 includes a reference to one or more sources for per fragment metadata for each of the fragments (or segments) of the media content for that period. Per fragment metadata for each fragment may identify a time duration or byte range, and/or an approximate start time or byte offset of the corresponding fragment relative to an initial start time or initial byte offset of the period of playback of the media content. Other types of data, such as per fragment video quality, may also be included in per fragment metadata.

As illustrated in FIG. 1, per fragment metadata is not actually included within fragment information 122 in composite manifest file 120. Instead, fragment information 122 includes a per fragment metadata reference 136 that identifies a per fragment metadata source 134 separate from the composite manifest file 120. In FIG. 1, per fragment metadata reference 136 is represented by a URL, HTTP://adcontent.com.v1.sidx.mp4. This URL identifies the per fragment metadata source 134 as a segment index (sidx) stored in an MPEG-4 file. In a class of implementations, per fragment metadata reference 136 is represented in composite manifest file 120 using a <RepresentationIndex> markup tag. In some implementations, the <RepresentationIndex> markup tag is included within a <SegmentBase> markup tag.

The per fragment metadata source 134 includes information that can be combined with fragment location information 138 to generate a properly formatted request for a particular fragment in period H at 1080p. For example, FIG. 1 depicts that period H includes Media Fragments 1-n, each fragment having per fragment byte range metadata 158A-D. In particular, per fragment metadata source 134 indicates that Media Fragment 1 of period H at the 1080p playback option has a byte range of 0-45619. For viewer device 105a to generate a request for media fragment 1 of period H at the 1080p playback option, the fragment location information 138 in the composite manifest file 120 (represented as mediacontent.mpd in FIG. 1) is combined with per fragment metadata retrieved from the file HTTP:// adcontent.com.v1.sidx.mp4. For example, the base URL of HTTP://adcontent.com.v1.mp4 (identified by fragment location information 138 in the mediacontent.mpd file) is appended with byterange=0-45619 (identified in the segment index file HTTP://adcontent.com.v1.sidx.mp4) to generate a URL HTTP://adcontent.com.v1.mp4/byterange=0-45619 that specifies media fragment 1 of period H of the 1080p playback option. In certain implementations, per fragment metadata is modified (e.g., offset, converted, etc.) prior to being combined with fragment location information 138.

Because the information in per fragment metadata source 134 (e.g., Media Fragment 1 having a byte range of 0-45619) is not included in composite manifest file 120 itself, the size of composite manifest file 120 is reduced relative to a manifest file type that includes such information (e.g., a manifest specifying a <SegmentList> markup tag that includes, for example, <segmentURL mediaRange=0-45619>). In some implementations, the reduced size of composite manifest file 120 reduces the time to first frame, parsing computation time, and/or memory storage requirements.

It should be appreciated that the media fragment 1 of the secondary content represented by period H has a byte range of 0-45619. Specifically, a media content fragment, such as, for example, a video, audio or subtitle fragment, in contrast to metadata (e.g., initialization metadata, per fragment metadata) begins with a byte offset of zero in the file HTTP:// adcontent.com.v1.mp4 (identified by fragment location information 138 in the mediacontent.mpd file). The composite manifest file 122 references separate sources for media content fragments and per fragment metadata. In the example of FIG. 1, media content fragments are stored at HTTP://adcontent.com.v1.mp4, and per fragment metadata is stored at HTTP://adcontent.com.v1.sidx.mp4. By not placing per fragment metadata in the beginning of the file storing media content fragments (i.e., HTTP:// adcontent.com.v1.mp4), the media content fragments can begin with a byte offset of zero.

In some systems that support devices with limited capabilities for insertion of secondary content, manifest data may stitch together primary content and secondary content that is effectively transparent to such viewer devices. In scenarios involving stitched manifest data, to provide a smooth transition between primary content to secondary content, media content fragments in a MPEG-4 file are expected to begin with a zero offset. For example, the 'moov' (movie metadata box) header that contains a virtual movie timeline with display characteristics, duration and timescale elements, and/or 'sidx' (segment index) header are removed. This allows the first 'moot' (movie fragment box) that contains audio, video or text portions of an elementary stream, which typically houses a closed GOP (Group of Pictures), to have a zero byte offset.

Therefore, the disclosed implementation of composite manifest file 120 allows the corresponding source for media content fragments (e.g., HTTP://adcontent.com.v1.mp4) to be compatible with requirements imposed by viewer devices using stitched manifest data. In some implementations, media content streaming systems supporting stitched manifests can be augmented with support for composite manifests without requiring changes in content encoding, publishing, and/or replication processes. For example, no new update is required in stable deployment encoding processes.

In FIG. 1, the source containing the per fragment metadata (e.g., HTTP://adcontent.com.v1.sidx.mp4) is separate from both the source containing the media fragments (e.g., HTTP://adcontent.com.v1.mp4) and the source containing initialization metadata 124 (e.g., HTTP:// adcontent.com.i1.mp4). In some implementations, the initialization metadata 124 is in the same source as per fragment metadata, and the two types of metadata can be distinguished using byte ranges. Different types of media content (e.g., audio, video, subtitles) can share the same per fragment metadata source or use different per fragment metadata sources (e.g., the same or different segment index files). Different playback options (e.g., 4K UHD, 1080p, and 720p) can share the same per fragment metadata source or use different per fragment metadata sources (e.g., the same or different segment index files). As an example, a media presentation can include multiple representations for video content (e.g., 4K UHD, 1080p, and 720p), and multiple representations for audio content (e.g., AAC-LC, AAC-HE, Dolby Digital+), and the per fragment metadata for fragments for each of the three representations for video content can be in one segment index file (e.g., different byte ranges within a MP4 file), and the per fragment metadata for fragments in each of the three audio representations can be in a second segment index file (e.g., different byte ranges within a MP4 file that is different than for the video representations).

The MPEG-4 file container format, the Media Presentation Description (MPD) format, the moof (movie fragment box), the moov (movie metadata box), the segment index file (sidx), the <RepresentationIndex> markup tag, and/or the <SegmentBase> markup tag referenced in the discussion of FIG. 1 are by way of example, and not limiting. Similarly, the example of per fragment metadata being byte ranges is by way of example. Other values, such as, for example, offsets, duration, etc. in bytes, time, etc. can be used.

It should be appreciated that by having per fragment metadata (header information) in a separate file, viewer device 105*a* using composite manifest file 120 can access the same set of video ad encoded fragments accessed by viewer devices using stitched manifest data when playing back secondary content. This allows a video streaming service to support insertion of secondary content for a wide range of device capabilities without significant increases in storing content fragments.

In some implementations, a video streaming service can perform Device capability (DTID) based stitching. For example, a server can use device capability information to determine whether to perform interstitial ID based stitching for some low-end devices where main content and ads have to match exactly, or to perform relaxed stitching for high-end devices, in order to optimize the customer experiences, such as adding four black boxes to accommodate aspect ratio changes.

In some implementations, a video streaming service can perform device capability (DTID) based manifest generation: For example, a server can use device capability information to determine whether to generate a "SegmentBase" manifest for some low-end devices, or a "SegmentList" manifest for others.

In some implementations, a video streaming service can perform Device capability (DTID) based supplemental stream processes (subtitle and trick play). For example, a server can use device capability information to determine whether to include such information inside a manifest or separate from the manifest.

Figure 2:
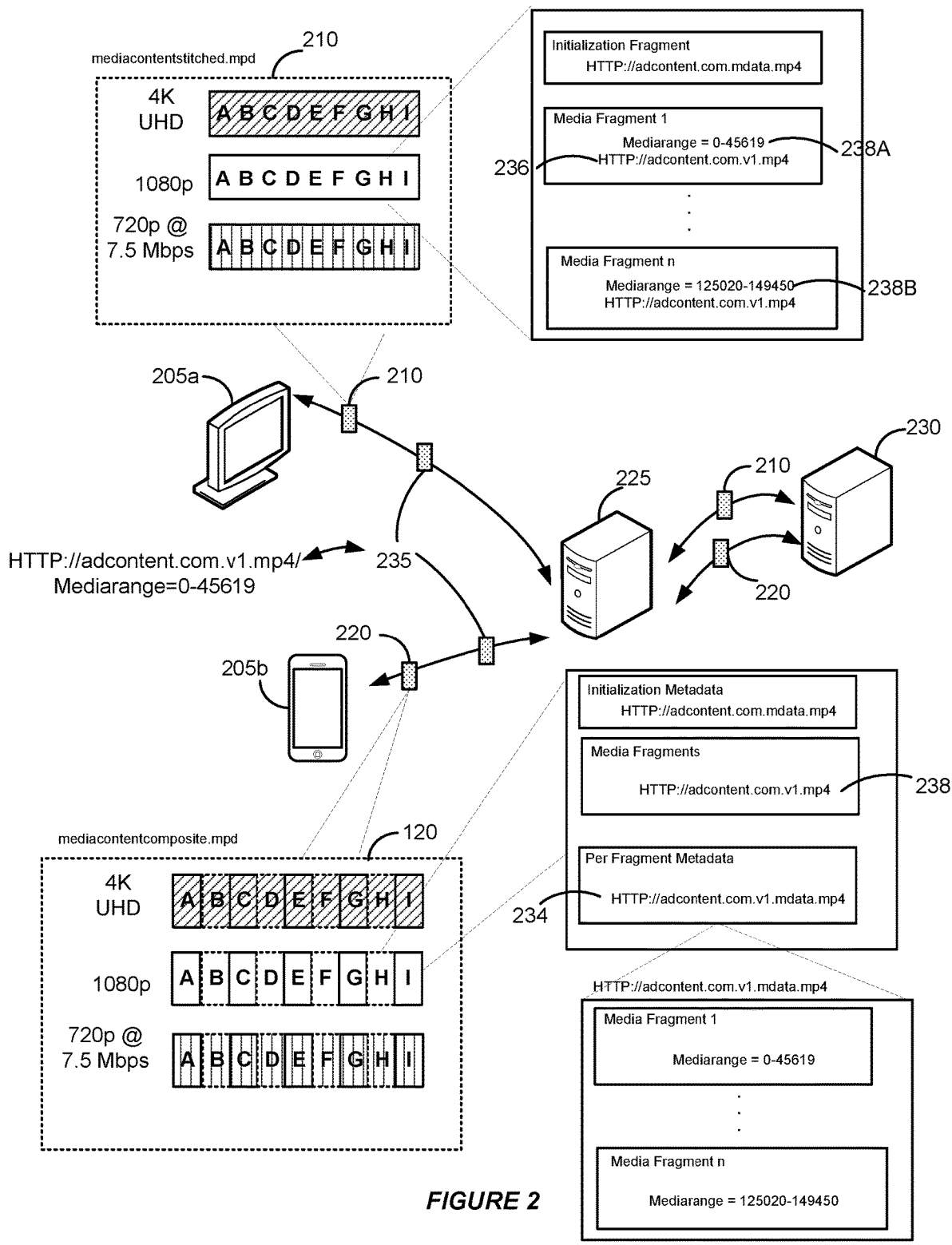
FIG. 2 illustrates an example of a computing environment in which stitched or composite manifests can be provided for media content playback.

FIG. 2 illustrates an example of a computing environment in which streaming media content can be provided to viewer devices with a wide range of capabilities. In some implementations, certain viewer devices are configured to use client side ad insertion, which involves using logic on the client to insert secondary content, such as, for example, an ad into the customer viewing experience. Some viewer devices are configured to use Server Side Ad Insertion (SSAI), which involves using logic on the server to insert secondary content into the customer viewing experience. In various implementations, different types of SSAI techniques are supported. Supported techniques include but are not limited to using stitched manifests for a type of SSAI where secondary content is stitched into the primary content manifest and the players play the primary content and secondary content as if it were a single continuous stream. For example, information indicated by URL keys are used by CDNs to decide what content to serve (primary or secondary), when to serve the content, and from where to pull the content fragments.

Another supported technique includes using composite manifests for a type of SSAI where secondary content is inserted into the primary content manifest and the player is signaled by syntax in the composite manifest to switch to a new content stream when transitioning between primary content and secondary content (e.g., Multi-period in MPEG-DASH or Discontinuities in HTTP Live Streaming).

Viewer devices 205a and 205b can request playback of the same media content by providing requests to media server 225 to stream the media content for playback on viewer devices 205a and 205b. In some implementations, viewer device 205b includes an additional parameter in its request that requests a particular type of manifest, such as a composite manifest or a stitched manifest. In various implementations, the request includes device capability information (e.g., device type identification (DTID)), which media server 225 uses to determine compatibility of a viewer device with a composite manifest and/or a stitched manifest.

Stitched or composite manifests can be provided for media content playback. As shown in FIG. 2, viewer devices 205a and 205b can receive manifest data such as manifest files 210 and 220, respectively, by media server 225. As a result, viewer devices 205a and 205b can request fragments at the 4K ultra-high-definition (UHD), 1080p, and 720p at 5 Mbps quality levels. Each manifest file includes metadata that allows the viewer device to generate properly formatted requests for specific fragments of the media content. A sequence of fragments together can provide playback of the media content. Audio portions of the media content can also be provided in fragments. Additional information, such as available subtitles, can also be provided in the manifest file.

Media server 225 can be an edge server of a content delivery network (CDN). Media server 225 can provide fragments of the media content for streaming playback on viewer devices 205a and 205b, as well as receive fragments from other components of the CDN (e.g., origin servers). In FIG. 2, media server 225 can communicate with manifest server 230, which can be an application server that can be part of or external to the CDN. In some implementations, the functionality of both media server 225 and manifest server 230 can be implemented within the same server, both within the same CDN, or across several servers. Media server 225 can provide information regarding viewer devices 205a and 205b making the requests for the manifest files to manifest server 230, and manifest server 230 can use this information to retrieve or generate manifest files 210 and 220. In some implementations, media server 225 supports a wide variety of encoding formats. In other implementations, media content requests are modified to a particular encoding format, such as capped variable bit rate (CVBR) H.264.

In the depicted implementation, manifest server 230 can be provided a request from media server 225 to retrieve previously generated or dynamically generate manifest files corresponding to the requests received from viewer devices 205a and 205b to stream the media content. Media server 225 might provide the title, cache key, and/or other type of identifier of the media content to manifest server 230.

Manifest server 230 can access information that can be used to retrieve or generate manifest files 210 and 220 for viewer devices 205a and 205b, respectively. In certain implementations, manifest server 230 includes a Dynamic Manifest Service (DMS) that dynamically generates primary content manifests for players. In some implementations, manifest server 230 includes a Manifest Stitching Service (MSS) that dynamically inserts references to secondary content into primary content manifests. The MSS can generate either stitched manifests or composite manifests. In various implementations, the MSS converts secondary content manifests (e.g., ad manifests, etc.). For example, an ad manifest using the SegmentBase markup tag can be converted to a manifest using the SegmentList markup tag. It should be appreciated that the same CDN host (e.g., edge server) can deliver either the stitched manifests or composite manifests to viewer devices.

Manifest server 230 can use information provided by media server 225 to determine the data to include in manifest files 210 and/or 220. Information maintained at manifest server 230 or provided by media server 225 to manifest server 230 can include or be derived, at least in part, from one or more of the following: metadata pertaining to the media content, request-specific information, and/or device profiles of viewer devices 205a and 205b.

Metadata pertaining to the media content can include fragment location information (e.g., URLs) and per fragment metadata (e.g., byte ranges, etc.) which provide location information for accessing media content and/or initialization fragments corresponding to the different playback options (e.g., quality levels).

Request-specific information can include or be derived from parameter(s) of a request for media content transmitted by a viewer device. For example, parameters can include an indication that a viewer device is configured to support composite manifests, an indication that the viewer device is requesting a composite manifest for the specific media content, and/or an indication that the viewer device is interested in a particular temporal or byte range of the media content.

Device profiles of viewer devices 205a and 205b can indicate device characteristics such as hardware and/or software capabilities. For example, device characteristics can include, but are not limited to, device type (e.g., smartphone, laptop computer, tablet, HD television), screen size or resolution, operating system, and/or memory capacity. Software capabilities can include, for example, operating system type, operating system version, and/or manifest processing configuration (e.g., whether the device is capable of parsing composite manifests).

Device profiles of viewer devices 205a and 205b can also indicate device manifest preferences. For example, a device profile of device 205b can indicate that device 205b has opted-in to receive composite manifests. Later, when device 205b opts out of receiving composite manifests, the device profile can be updated by a server such as manifest server 230. As another example, a device profile can indicate a request for a composite manifest for the media content (e.g., for a specific request) by providing an indication in its request for the media content, irrespective of the opt-in or opt-out status.

In FIG. 2, since viewer device 205a supports only stitched manifest files, manifest server 230 can retrieve stitched manifest file 210 and provide stitched manifest file 210 to media server 225 to provide to viewer device 205a. Stitched manifest file 210 includes data for the fragments corresponding to the time periods A-I for playback of the media content at the 4K UHD, 1080p, and 720p at 5 megabits per second (Mbps) video quality levels (or bitrates). As illustrated in FIG. 2, stitched manifest file 210 includes both media fragment locator 236 and per fragment metadata 238A-D for the content fragments corresponding to time period H at 1080p. It should be appreciated that reference to time periods A-I for stitched manifest file 210 are for purposes of clarifying the temporal relationship to composite manifest file 220, rather than requiring a specific syntax to be used in stitched manifest file 210. For example, stitched manifest file 210 may utilize syntax specifying a single period, with different portions of the single period corresponding to different periods specified using a multi-period syntax in composite manifest file 220.

Viewer device 205b, unlike viewer device 205a, can request a composite manifest or opt-in to receive composite manifests. Media server 225 can contact manifest server 230 regarding the request, and composite manifest file 220 can be provided by manifest server 230 in communication with media server 225. Manifest server 230 can determine that viewer device 205b supports composite manifest files, and retrieve composite manifest file 220 or generate composite manifest file 220.

A composite manifest such as composite manifest file 220 can be generated statically or dynamically (e.g., in response to a request from a viewer device), and can be generated by a server such as manifest server 230 or media server 225. In the depicted implementation, composite manifest file 220 is generated by manifest server 230. Alternatively, any of manifest files 210 and 220 can be provided independently by media server 225.

Manifest server 230 can generate composite manifest file 220 indicating that all of the fragments in periods A-I of the media content can be requested at the 4K UHD, 1080p, and 720p at 5 megabits per second (Mbps) video quality levels. Composite manifest file 220 includes references to per-fragment metadata for each of the fragments in periods A-I. For example, the per-fragment metadata can include a fragment duration, fragment byte range, and/or fragment quality level. Composite manifest file 220 can be formatted as described for composite manifest file 120 for FIG. 1.

In this example, viewer device 205a supports only stitched manifests, while viewer device 205b supports stitched manifest and/or the composite manifests enabled by the present disclosure. Media server 225 and/or manifest server 230 are configured to support both viewer device 205a and viewer device 205b.

Viewer devices 205a and 205b can represent different media content streaming capabilities and/or different types and/or versions of media players. For example, viewer device 205b might be a smartphone running an operating system or software application that can be replaced or updated with new media content streaming capabilities. Viewer device 205a may present limitations in media content streaming capabilities. For example, viewer device 205a may be part of a class of living room (LR) devices that do not support client-side ad insertion, and furthermore, cannot be updated with such capabilities due to hardware, security, and/or cost constraints. In some implementations, a provider of streaming content services wants to be able to support a wide range of end-user devices, such as, for example, viewer device 205a and 205b.

As an example, viewer device 205b is in a first class of viewer devices that can parse composite manifest data with multiple time periods that include periods of primary content and periods of secondary content. The primary content and secondary content can be from different sources, such as separate files (e.g., mediacontent.com.v1.mp4 and adcontent.com.v1.mp4, etc.). The viewer device's request for a content fragment can specify a particular portion of a file, such as, for example, a specific byte range in either the main content file or ad content file.

In contrast, viewer device 205a is in a second class of viewer devices that cannot parse composite manifest data with multiple periods, and instead relies on stitched manifest data that enables inserting secondary content into primary content in ways that are effectively transparent to the viewer devices. The stitched manifest data allows a viewer device to generate a request for a content fragment that can be mapped to different sources, such as the mediacontent.com.v1.mp4 or adcontent.com.v1.mp4 files. However, the stitched manifest data requires the different sources to conform to certain characteristics. For example, the media content to be played back (audio fragments, video fragments, or the subtitle fragments, etc.) within adcontent.com.v1.mp4 starts from zero offset, such that the transition from primary content to secondary content is not interrupted by byte values corresponding to data other than media content (e.g., initialization or per fragment metadata).

An example of requesting a fragment using the composite manifest file 220 is as follows. Viewer device 205b parses composite manifest file 220 to obtain the reference to per fragment metadata source 234 that includes information that can be combined with fragment location information 238 to generate a properly formatted request for a particular fragment in period H at 1080p. For instance, per fragment metadata source 234 indicates that Media Fragment 1 of period H at the 1080p playback option has a byte range of 0-45619. The fragment location information 238 in the composite manifest file 220 is combined with per fragment metadata retrieved from the file HTTP://adcontent.com.v1.mdata.mp4. For example, the base URL of HTTP://adcontent.com.v1.mp4 (identified by fragment location information 238 in the mediacontent.mpd file) is appended with byterange=0-45619 (identified in the segment index portion of the file HTTP://adcontent.com.v1.mdata.mp4) to generate a URL HTTP://adcontent.com.v1.mp4/byterange=0-45619 that specifies media fragment 1 of period H of the 1080p playback option.

An example of a portion of composite manifest file 220 is as follows:
<BaseURL>adcontent.com.v1.mp4</BaseURL>
<SegmentBase timescale="30000" presentationTimeOffset="0">
<Initialization sourceURL="adcontent.com.v1.mdata.mp4" range="0-750"/>
<RepresentationIndex sourceURL="adcontent.com.v1.mdata.mp4" range="751-1658"/>
</SegmentBase>

The example syntax shown includes a first markup tag <BaseURL>HTTP://adcontent.com.v1.mp4</BaseURL>, which includes an HTTP URL indicating part of the location information for a fragment. Fragment specific information such as byte ranges are not included in composite manifest file 220, thus the size of the manifest file is reduced.

The Initialization markup tag points to a source, such as, for example, a moov that defines the Init Segment. The Init Segment contains decoder and decryption initialization data, indicating if the content is encrypted (and if so, the default key id, etc.), and the codec private data.

In various implementations, media content information conforms to the ISO base media file format which stores data in a series of objects, referred to as "boxes." As an example, data may be stored in the media content source (e.g., a MPEG-4 file) that includes a file type (FTYP) box, a movie (MOOV) box, movie fragments (also referred to as movie fragment boxes (MOOF)), and a movie fragment random access (MFRA) box. In certain conventional implementations, the media content source also includes one segment index ("sidx") box, and in some conventional implementations, additional "sidx" boxes between movie fragments. A "sidx" box includes information that describes byte ranges for one or more of the movie fragments in the media content source.

In the presently disclosed techniques for composite manifest data, the "sidx" box(es) are provided separately from the media content source such that movie fragment boxes (MOOF) can begin in the media content source with zero offset. In the above example syntax, the RepresentationIndex markup tag points to the location of the separate sidx box (e.g., adcontent.com.v1.mdata.mp4). The information provided by the sidx box includes but is not limited to per fragment metadata, such as the precise byte range locations of the fragments in, such as, for example, fragmented MPEG-4 files.

The initialization metadata and per fragment metadata can be in the same file or in separate files. In this example, the byte ranges differentiate between moov (e.g., 0-750) and sidx (e.g., 751-1658) in the adcontent.com.v1.mdata.mp4 file.

The presentationTimeOffset markup tag specifies the start time of the first fragment in the series of fragments. Such information is used in, such as, for example, in Multi-period MPEG-DASH for the primary content to resume to the correct time offset after playing ad periods.

It should be appreciated that markup tags such as SegmentList and SegmentDurations are not required in the composite manifest format.

An example of requesting a fragment using stitched manifest file 210 is as follows. Viewer device 205a parses stitched manifest file 210 to obtain the embedded per fragment metadata 238A-B that includes information that can be combined with fragment location information 236 to generate a properly formatted request for a particular fragment in period H at 1080p. For instance, per fragment metadata 238A indicates that Media Fragment 1 of period H at the 1080p playback option has a byte range of 0-45619. The fragment location information 236 in the stitched manifest file 210 is combined with the embedded per fragment metadata to generate a URL HTTP://adcontent.com.v1.mp4/byterange=0-45619 that specifies media fragment 1 of period H of the 1080p playback option.

An example of a portion of stitched manifest file 210 is as follows:
<BaseURL>2@key/adcontent.com.v1.mp4</BaseURL>
<SegmentList duration="192" timescale="30000">
<Initialization range="0-750"/>
<SegmentURL mediaRange="0-45619"/>
<SegmentURL mediaRange="45620-70825"/>
<SegmentURL mediaRange="70826-96499"/>
<SegmentURL mediaRange="96500-125019"/>
<SegmentURL mediaRange="125020-149450"/>
</SegmentList>

The SegmentList markup tag indicates a set of media content fragment, and the SegmentURL markup tag provides per fragment metadata. In some implementations, the 2@key syntax within the BaseURL markup tag of stitched manifest file 210 indicates that logic for inserting secondary content in a manner that is transparent to the viewer device is to be used by media server 225. In certain implementations, syntax (e.g., 3@) can be included within the BaseURL markup tag in composite manifest file 220 to indicate that logic for inserting secondary content for viewer devices supporting composite manifests is to be used by media server 225.

FIG. 2 illustrates that viewer devices 205a and 205b both access media fragment 1 of period H of the 1080p playback option, illustrated as media content fragment 235, from the same media content source. Specifically, media content fragment 235 corresponds to the URL of HTTP://adcontent.com.v1.mp4/byterange=0-45619. As a result, separate media content sources are not required despite the different types of manifest data, and the different types of fragment retrieval strategy (e.g., URL key light function processing for stitched manifest, no URL key processing for composite manifests, etc.) being used by viewer devices 205a-b.

Figure 3:
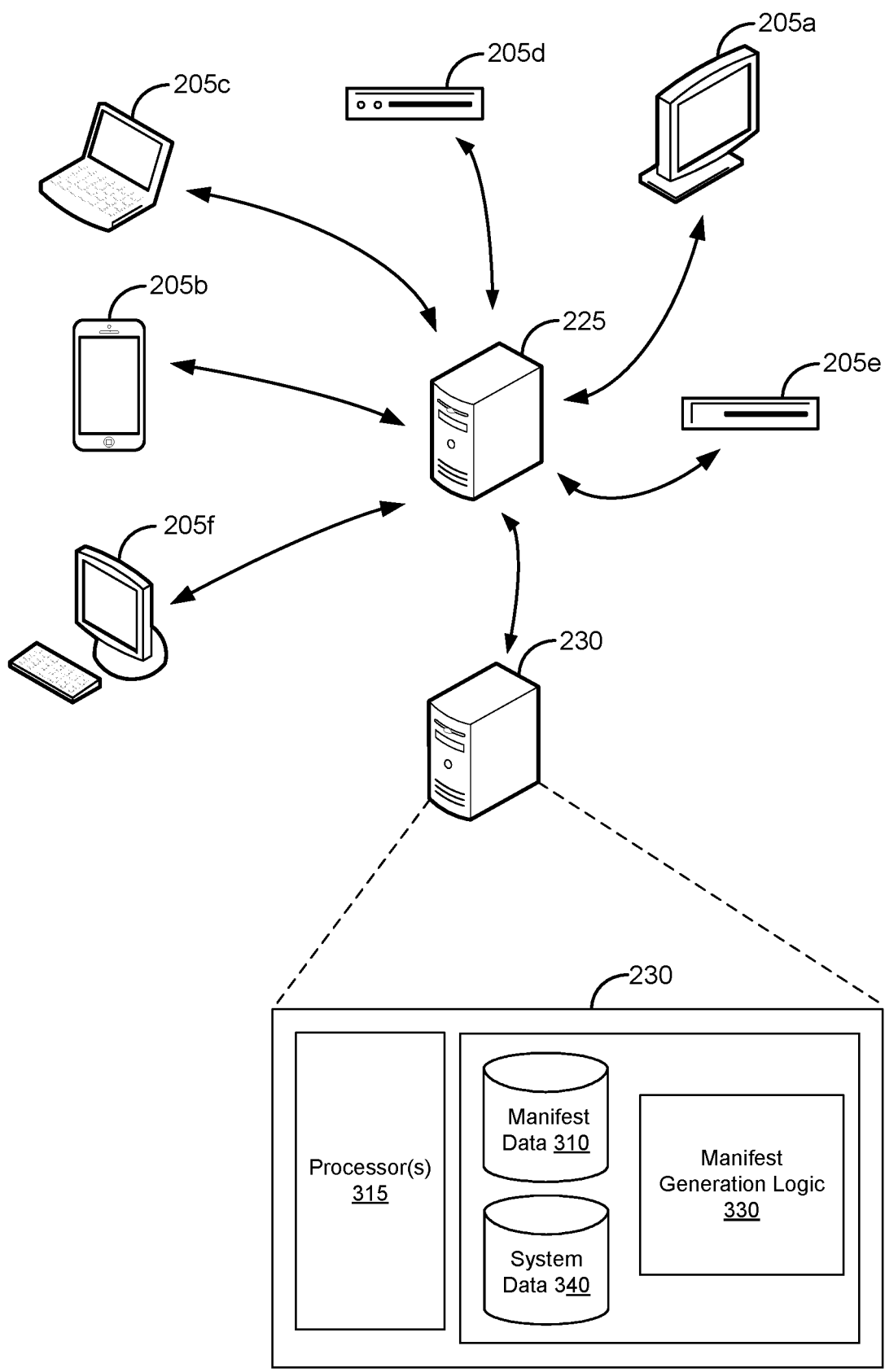
FIG. 3 illustrates an example of a computing environment in which composite manifests can be used for media content playback.

FIG. 3 illustrates an example of a computing environment in which stitched or composite manifests can be used for media content playback. The computing environment of FIG. 3 includes media server 225 which can be used to provide media content for playback on viewer devices 205a-e. Viewer device 205a is a television, viewer device 205b is a smartphone, viewer device 205c is a laptop computer, viewer device 205d is a set-top box, viewer device 105e is a video game console, and viewer device 205f is a desktop computer. Other types of devices such as tablets, wearable devices (e.g., smart watches), virtual reality headsets, etc. may also be included in the computing environment.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 225 and/or manifest server 230 may be part of a content delivery system that conforms to any of a wide variety of architectures. The functionality and components of media server 225 and manifest server 230 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more of different entities. For example, the functionality to provide playback of media content can be integrated into a video player or software client under control of one entity (e.g., on viewer devices 205a-e), integrated into a separate app from another entity, implemented in an edge server or content server of a CDN, a server of an ISP, etc.

Media server 225 can include various types of logic used to provide media content for playback at viewer devices 205a-f. In FIG. 3, media server can include media content storage for storing fragments of media content and playback handling logic to provide fragments to viewer devices 205a-f.

In addition, manifest server 230 can include various types of logic used to retrieve and/or generate manifest files for facilitating the playback of media content by viewer devices 205a-f. Manifest server 230 also can include one or more processors 315, memory, and other hardware for performing the tasks disclosed herein. Media server 225 and viewer devices 205a-f can also include processors, memory, and other hardware.

Manifest generation logic 330 can use data including manifest data 310 and/or system data 340 to statically or dynamically generate manifest files that can be provided to viewer devices 205a-f for playback of media content. Manifest generation logic 330 can determine whether to provide a stitched manifest or composite manifest based on parameters in the manifest request, and/or based on device characteristics.

Manifest data 310 can include data including details regarding fragments of the video portion of the playback for media content, details regarding fragments of the audio portion of the playback for media content, subtitles, and/or other types of data related to the playback of media content for different playback options. For example, manifest data 310 can include URLs and/or byte ranges associated with media fragments including video fragments and/or audio fragments. System data 240 can include data regarding device profiles (e.g., device characteristics, manifest preferences) and other types of data described herein that can be used to retrieve or generate an appropriate manifest.

In further detail, referring back to FIG. 1 and FIG. 2, manifest generation logic 330 of manifest server 230 can generate stitched manifest file 210 by embedding per fragment metadata, or can generate composite manifest file 220 by including one or more references identifying locations of per-fragment metadata sources, rather than including the per-fragment data in the composite manifest 220 itself.

In some implementations, the per fragment metadata may also include per-fragment quality values. Each quality value is an objective measure of the visual quality of that fragment. The quality value associated with a fragment may be determined based upon characteristics of the fragment. Each fragment can be represented by a set of parameters that can be used to determine its associated quality value. The set of parameters can include parameters associated with the fragment and/or its constituent frames. For video fragments, such frame parameters might include, for example, quantization parameters, rate factors, frame size, frame type, what portion of a frame is intra versus predicted, the degree of motion in a frame, whether a frame is black, whether a frame is part of a fade, peak signal-to-noise ratio (PSNR), a codec's internal metric(s) (e.g., Rate Factor in x264 and x265), relative and absolute number of bits spent on intra prediction, motion vectors, residual coding, chroma information, luma information, spatial and temporal frequency distribution, what other frames such frames reference, what frames they are referenced by, position in the fragment, position in a scene, if a frame starts or ends a fragment, Structural Similarity (SSIM), Motion-based Video Integrity Evaluation (MOVIE) index, Tektronix PQA, etc. For audio fragments, such parameters might include, for example, quantization parameters, PSNR, Perceptual Evaluation of Audio Quality (PEAU), etc. A parameter for a given fragment or group of fragments may not necessarily be derived from its constituent frames but may be any information by which the fragment can be reliably compared and classified in a manner that is predictive of perceived quality.

Figure 4:
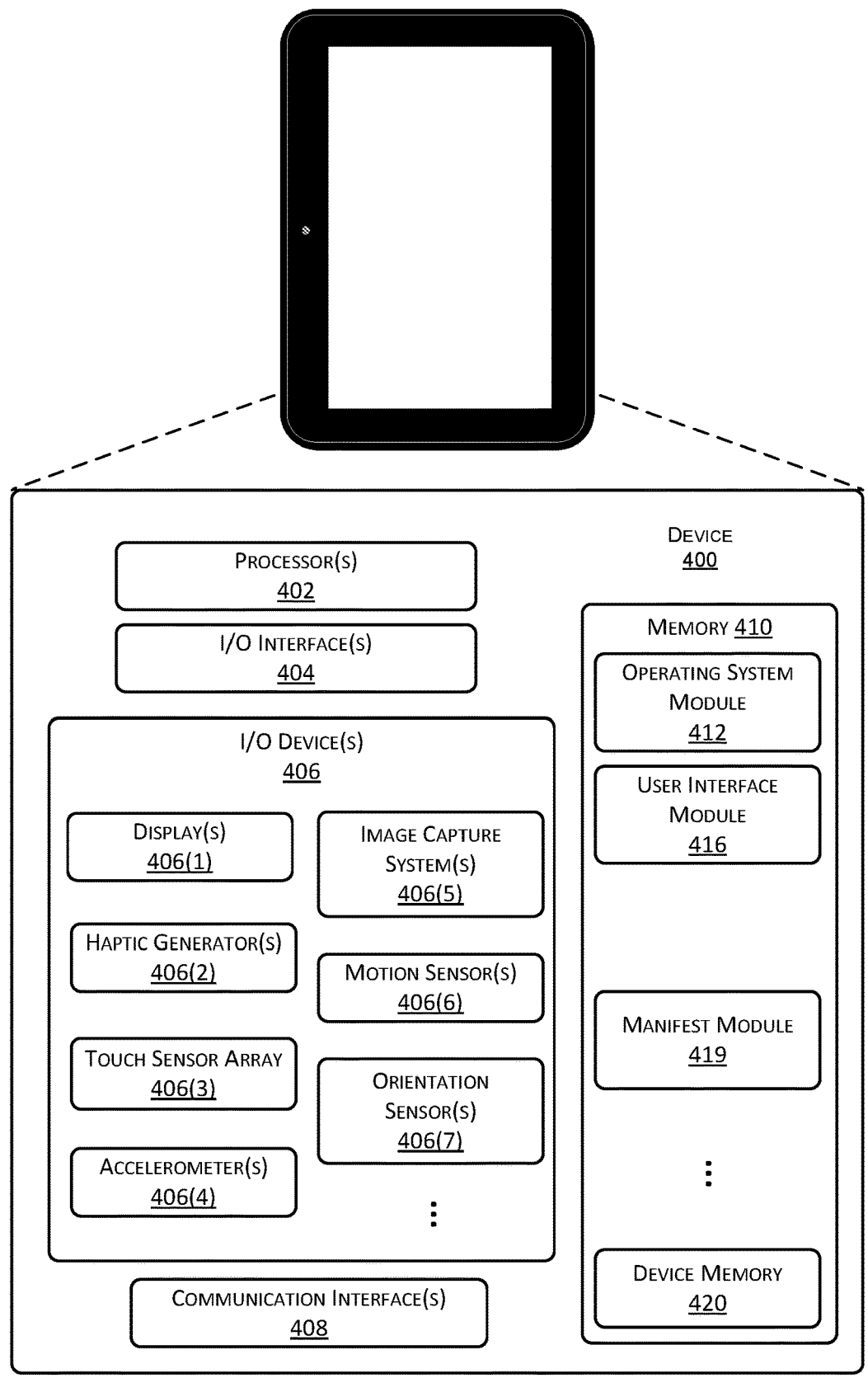
FIG. 4 is a simplified block diagram illustrating an electronic device that may be employed with various implementations.

FIG. 4 is a simplified block diagram illustrating an electronic device that may be employed with various implementations. Device 400 includes one or more single or multi-core processors 402 configured to execute stored instructions (e.g., in device memory 410). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-232 interface, a media device interface, and so forth. I/O interface(s) 404 is coupled to one or more I/O devices 406. The I/O device(s) 406 may include one or more displays 406(1), one or more haptic generators 06(2), a touch sensor array 406(3), one or more accelerometers 206(4), one or more image capture systems 206(5), one or more motion sensors 406(6), one or more orientation sensors 406(7), microphones, speakers, and so forth. The one or more displays 406(1) are configured to provide visual output to the user and may comprise any of a variety of display types including, for example, any type of reflective or transmissive display. Touch sensor array 406(3) may be a capacitive sensor array having a matrix of conductors that are scanned to determine, for example, the location, duration, speed and direction of touch events within the matrix based on changes in electrical capacitance.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi LAN and a Bluetooth PAN. Device 400 also includes one or more buses or other internal communications hardware or software that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. Memory 410 includes at least one operating system (OS) module 412 configured to manage hardware resources such as I/O interfaces 404 and provide various services to applications or modules executing on processor(s) 402.

Memory 410 also includes a user interface module 416, a content rendering module 418, manifest module 419, and other modules. Manifest module 419 may be configured to parse manifests received from media server 230. More particularly, device 400 may be configured to parse stitched manifests and/or composite manifests. For example, where a composite manifest is not available, device 402 may be configured to recognize and parse a stitched manifest.

In addition, manifest module 419 may be configured to compose and transmit a request to a media server (e.g., edge server) for media content. Manifest module 419 may enable device 402 to request a composite manifest for the media content by providing an indication in the request for media content. The request may also include one or more additional parameters such as an indication of a desired fragment range. Similarly, manifest module 419 may enable device 402 to opt-in or out of receiving composite manifests (e.g., for media content that is subsequently requested by device 400) by providing an indication in the request for media content or transmitting a separate message to media server or another server.

Memory 410 also includes device memory 420 to store a wide variety of instructions and information using any of a variety of formats including, for example, flat files, databases, linked lists, trees, or other data structures. Such information includes content for rendering and displaying on display 406(1) including, for example, any type of video content. In some implementations, a portion of device memory 420 may be distributed across one or more other devices including servers, network attached storage devices, and so forth.

The logic or computer program instructions used to support the processing of manifests (represented by manifest module 419) may be implemented in a variety of ways. For example, at least some of this functionality may be implemented as part of the code of a video decoder and/or media player operating on device 400. And as mentioned above, implementations are contemplated in which at least a portion of the logic or computer program instructions may reside on a separate platform, e.g., media server 225, manifest server 230, etc. Suitable variations and alternatives will be apparent to those of skill in the art. It will also be understood that device 400 of FIG. 4 is merely an example of a device with which various implementations of the present invention may be practiced, and that a wide variety of other devices types may also be used (e.g., devices 205-a to 205-f). The scope of the invention should therefore not be limited by reference to device-specific details.

In some implementations, stitched manifest files and composite manifest files conform to the Dynamic Adaptive Streaming over HTTP (DASH) standard, also known as MPEG-DASH. MPEG-DASH is an adaptive bitrate streaming technique that enables streaming media content to be streamed over the Internet from conventional HTTP servers. In accordance with MPEG-DASH, media content is partitioned into a sequence of small HTTP-based file segments, or fragments, where each segment contains an interval of playback time of the media content. For example, the media content may be a movie, an episode of a television show, or a live broadcast of a sporting event. The media content is made available at a variety of different bitrates in different corresponding sets of segments, where the sets of segments correspond to aligned intervals of playback time. A manifest (e.g., referred to as a Media Presentation Description in ISO/IEC 23009-1) provides information for adaptive streaming of media content by enabling a client device to download media fragments. International standard ISO/IEC 23009-1 specifies formats for the manifest and segments for dynamic adaptive streaming of MPEG media over HTTP. It should be appreciated that the presently disclosed techniques are not limited to the MPEG-DASH standard.

Figure 5:
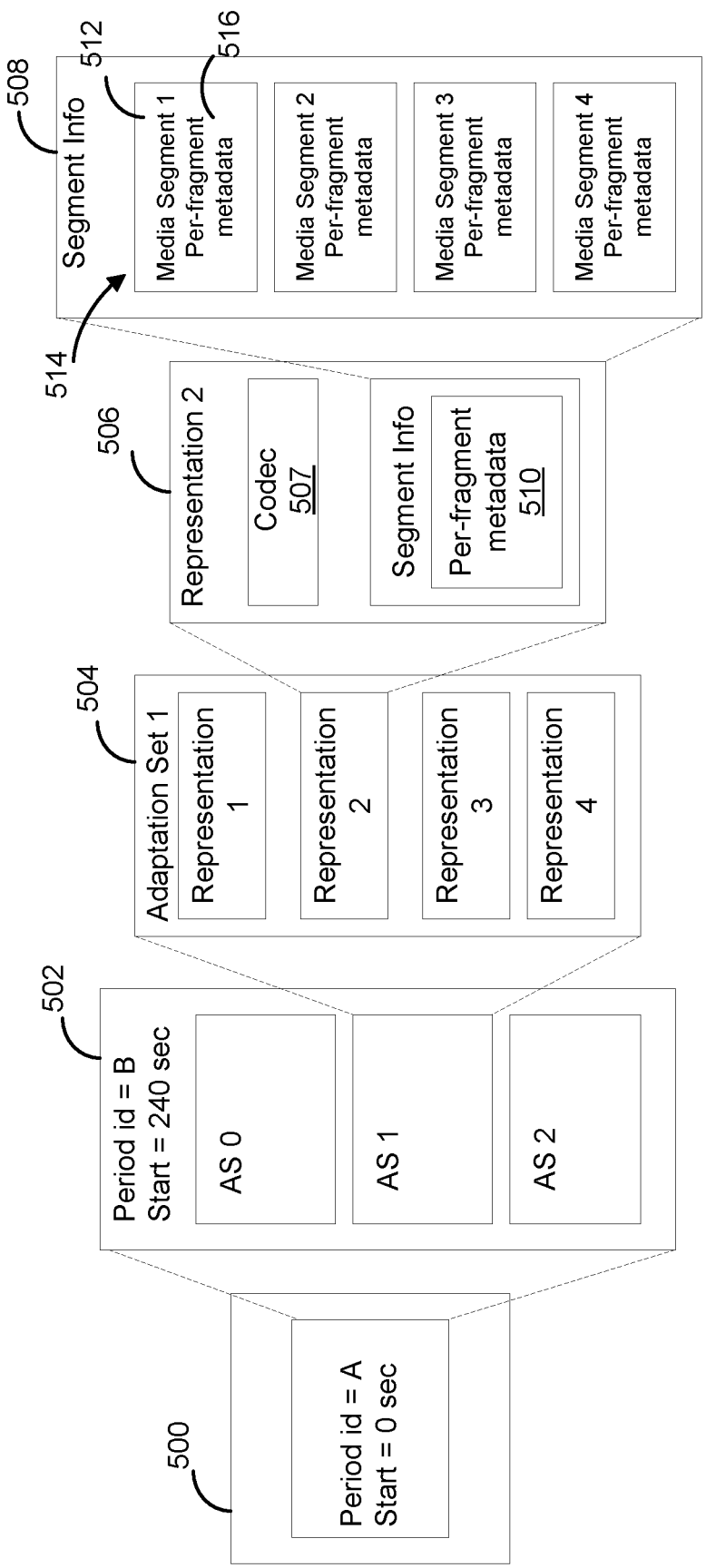
FIG. 5 illustrates an example of a format of a composite manifest for media content playback.

FIG. 5 illustrates an example of a format of a manifest for media content playback based on the MPEG hierarchy. Manifest 500 can include metadata for a single period of playback time of media content. For the single period 502, different playback options are represented as one or more adaptation sets 504, where each adaptation set 504 includes metadata for a plurality of representations 506. Each of the representations 506 corresponds to a different one of a plurality of playback options. More particularly, metadata associated with representation 506 enables the media content to be played back via fragments of a media file associated with the corresponding playback option.

In the implementation depicted in FIG. 5, manifest 500 includes, for each representation 506, a codec private data attribute 507 that includes codec private data for the representation. Codec private data includes parameters that are used by a client device to initialize its video decoder to decode a video stream for the corresponding representation 506. For example, codec private data can include High Efficiency Video Coding (HEVC) parameters that are used to decode a video stream encoded by an HEVC/H.265 encoder. HEVC parameters generally include a video parameter set (VPS), a sequence parameter set (SPS), and a picture parameter set (PPS). Codec private data can be represented as a single string or multiple strings.

In addition, fragment information 508 for representation 506 includes per-fragment metadata 510 for each of the fragments. Per-fragment 510 metadata can include, but is not limited to, per-fragment duration, per-fragment byte-range, and/or per-fragment quality value. A per-fragment quality value is representative of the visual quality of the fragment as it will be perceived by a viewer. As shown in this example, per-fragment metadata 510 can be provided separately for each media fragment 512 within manifest 500, as shown at 516.

Figure 6:
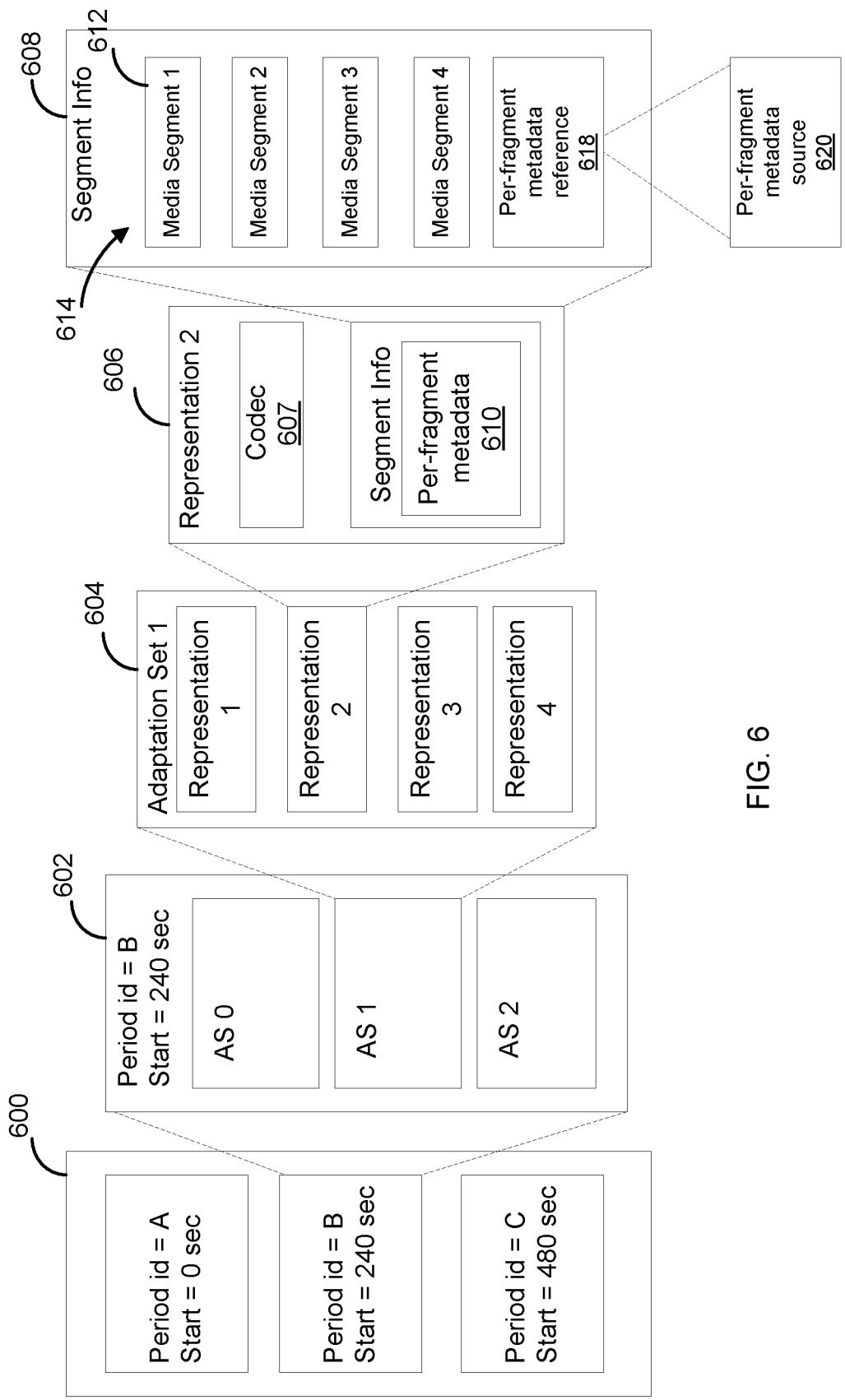
FIG. 6 illustrates an example of a second format of a composite manifest for media content playback.

FIG. 6 illustrates an example of a format of a composite manifest for media content playback. Manifest 600 can include metadata for a plurality of periods of playback time of media content. In the example depicted in FIG. 6, manifest 600 includes metadata for three different periods. In the implementation depicted in FIG. 6, per-fragment metadata 610 for representation 606 is provided for fragments corresponding to media fragments 612 in a separate file illustrated as per fragment metadata source 620, as identified by per fragment metadata reference 618. In other words, per-fragment metadata for multiple media fragments 612 can be located by per fragment metadata reference 618, rather than provided within the manifest file as shown in FIG. 5. While per fragment metadata reference 618 is shown in the implementation depicted in FIG. 6 to be within the code segment (e.g., a particular region in a markup file delimited by a particular markup tag) for representation 606, section 618 can also be provided at other locations in the manifest file.

The reference to external per fragment metadata can be provided in a variety of formats within a manifest file. In some implementations, the reference to external per fragment metadata can be provided with a segment of code for fragment information for a particular representation. As another example, the reference to external per fragment metadata can be provided with a segment of code for fragment information for a particular adaptation set.

Figure 7:
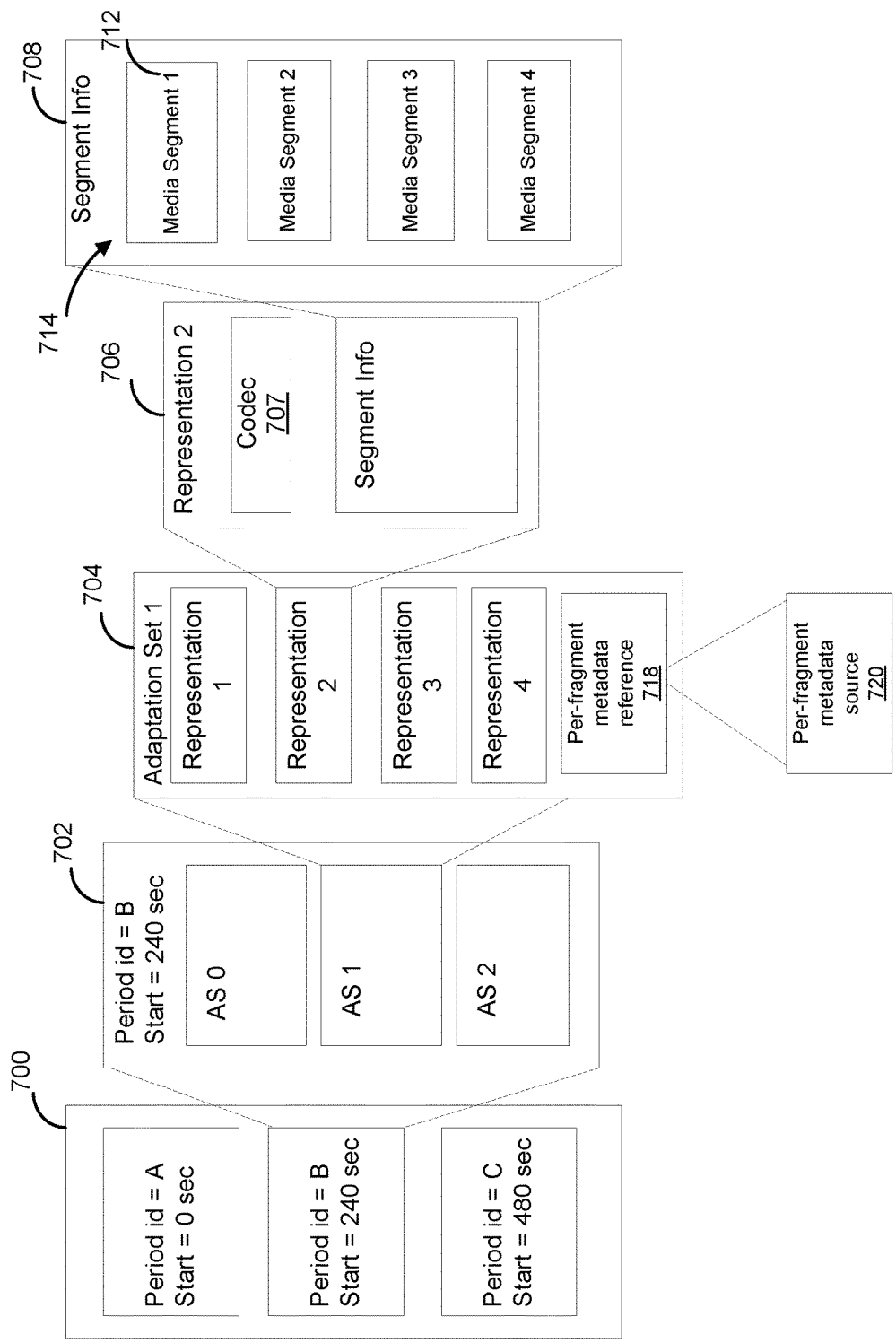
FIG. 7 illustrates an example of a third format of a composite manifest for media content playback.

FIG. 7 illustrates an example of a second format of a composite manifest for media content playback. In the implementation depicted in FIG. 7, per fragment metadata reference 718 for per fragment metadata source 720 is provided for markup tag syntax each adaptation set 704. For example, per-fragment metadata source 720 can include fragment durations and/or byte ranges for each fragment of adaptation set 704.

The implementations depicted in FIGS. 6-7 are merely illustrative, and other formats for generating composite manifests are possible. Furthermore, the examples of the types of metadata that may be provided in a per fragment metadata source described above are merely illustrative, and other types of metadata may also be included.

The reference to external per fragment metadata can be provided in a variety of locations within a particular segment of code in a manifest file. In certain implementations, the reference to external per fragment metadata can be provided at the end of a segment of code, such as, for example, for adaptation set 704 as shown at 720 of FIG. 7 or, as another example, the reference to external per fragment metadata can be provided at the beginning of the segment of code for adaptation set 704.

By specifying per fragment metadata within a manifest file itself, the complexity and size of the manifest file can increase substantially. As a result, the amount of memory of a client device consumed by a stitched manifest can be significantly greater than a composite manifest. In some implementations, due to the smaller manifest file size, the amount of time spent by a client device parsing a composite manifest can be reduced, thereby reducing a time to first frame.

Figure 8:
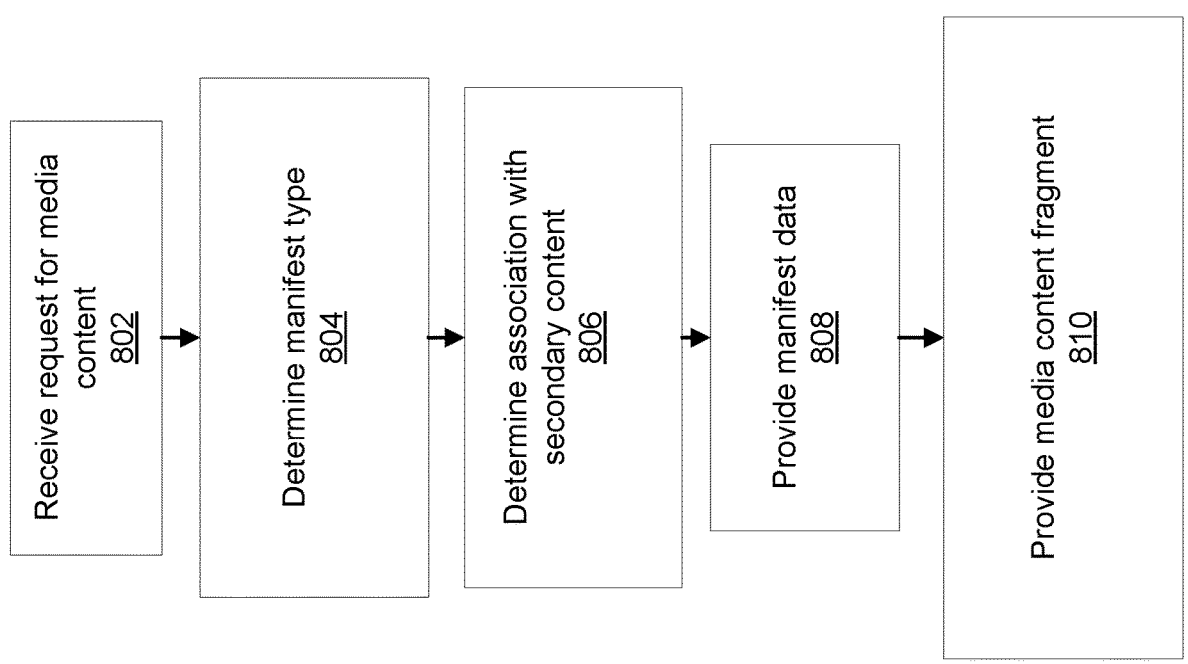
FIG. 8 is a flowchart illustrating a method of providing composite manifests for media content playback.

A specific implementation will now be described with reference to FIG. 2, the computing environment of FIG. 3, the manifest formats of FIGS. 6-7, and the flow diagram of FIG. 8.

An indication that a viewer device has requested media content is received by a server (802).

The type of manifest data, such as composite manifest data or stitched manifest data, to provide in response to the request for media content, is determined (804). In the implementation depicted in FIG. 8, the viewer device supports composite manifests. The viewer device may have specifically requested a composite manifest for the media content or may have previously opted-in to receive composite manifests. Alternatively, a device profile (e.g., device characteristics) may indicate that the viewer device supports composite manifests.

In some implementations, the viewer device specifies a parameter, such as, for example, manifest_type="baseSegment" to indicate a request for a composite manifest. In certain implementations, a parameter such as a deviceVideoCodecOverride attribute is used to identify whether video encoding parameters should be converted to a particular configuration, such as H264. In certain scenarios, overriding requested video encoding parameters can increase compatibility with different viewer devices, and/or reduce the required changes to existing streaming video service deployments when adding the presently disclosed techniques for server-side ad insertion. For example, the request from the viewer device for a composite manifest may indicate {manifest_type="baseSegment", deviceVideoCodecOverride="H264"}.

The association of secondary content with the requested media content is determined (806). In various implementations, player resource management logic may determine the presence of cuepoints indicating secondary content, such as, for example, ads. The player resource management logic can request a URL for a manifest specifying both primary content and secondary content from a manifest server (e.g., a manifest stitching service (MSS)) if ads are detected. For example, the MSS can call a dynamic manifest service (DMS) to get the manifest for the primary content of the requested media content. The MSS will specify encoding=baseSegment as a query parameter as indicated in the request from the viewer device, and the DMS will return manifest data for primary content using the SegmentBase syntax instead of the SegmentList syntax. In some implementations, the MSS then calls a separate server for an ad manifest to combine with the manifest data for primary content. In a class of implementations, the ad manifests provided to the MSS will use syntax such as SegmentList, and the MSS will convert from the SegmentList syntax to the SegmentBase syntax. In some implementations, the MSS will cache the SegmentBase version of the Manifest. The MSS can put a text string, such as, for example, 3@, in the URL for requesting manifest data as an identifier for a multi-period manifest having secondary content. The URL for requesting manifest data can then be provided to the viewer device.

A request for manifest data is received from the viewer device (808). For example, a viewer device calls a CDN as part of a request for a manifest. If the manifest URL contains a text string, such as, for example, 3@, the CDN will call, such as, for example, the MSS for getting the composite manifest having primary content and secondary content. The MSS can return the composite manifest with multiple periods using the SegmentBase syntax to the CDN, and the CDN can provide the composite manifest to the viewer device.

If the manifest URL does not contain, such as, for example, 3@, the CDN will call the DMS for manifest data containing the primary content (if the corresponding manifest data is not already cached at the CDN), and the manifest data containing primary content can then be provided to the viewer device by the CDN.

A request for a media content fragment is received from the viewer device (810). In some implementations, the CDN can receive a request for a media content fragment from the viewer device. For example, based on the period associated with the requested media content fragment, the CDN can request primary content from a main content source. If the requested media content fragment is identified to be secondary content, the CDN can request secondary content from, as an example, an ad server. The CDN provides the fragment of primary content or fragment of secondary content to the viewer device.

In some implementations, the absolute URL of, for example, a MPEG-4 file, is included in the ad period of the composite manifest. In certain implementations, the relative URL of, for example, a MPEG-4 file, is included in the primary content period of the composite manifest.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
receiving an indication of a first request for a video on demand content presentation, the first request being generated by a first client device;
determining based on a parameter in the indication of the first request that a first type of manifest is being requested by the first client device;
determining that the content presentation being requested is associated with both main content and advertising content;
identifying manifest data associated with the content presentation, the manifest data including playback options for the main content and the advertising content;
generating a first subset of the manifest data based on the determined first type of manifest being requested, the first subset including first location information for fragments of the main content and fragments of the advertising content, the first location information including a base URL specifying a first portion of a first uniform resource locator (URL) representing a network address for requesting a first fragment in the fragments of the advertising content, the first subset also including an index URL, the index URL representing a network address for obtaining per fragment metadata, the per fragment metadata including byte range information for a second portion of the first URL, the network address for requesting a first fragment and the network address for obtaining per fragment metadata corresponding to different files; and
providing a first manifest file that includes the first subset of the manifest data to the first client device.

2. The method as recited in claim 1, receiving an indication of a second request for the content presentation, the second request being generated by a second client device;
determining that a second type of manifest is being requested by the second client device;
generating a second subset of the manifest data based on the determined second type of manifest being requested, the second subset including second location information for fragments of the main content and fragments of the advertising content, the second location information including the base URL specifying a first portion of a third uniform resource locator (URL) representing a network address for requesting a second fragment in the fragments of the advertising content, the second subset also including the per fragment metadata including byte range information for a second portion of the third URL; and
providing a second manifest file including the second subset of the manifest data to the second client device.

3. The method as recited in claim 2, wherein the first manifest file and the second manifest file correspond to Dynamic Adaptive Streaming over HTTP (DASH) manifest files;
further wherein the first manifest file includes multiple periods and the index URL for obtaining per fragment metadata is included in a <RepresentationIndex> markup tag included in a <SegmentBase> markup tag; and
further wherein the second manifest file includes a single period and the per fragment metadata is included in a <SegmentList> markup tag.

4. The method as recited in claim 3, wherein the base URL represents an advertising content MPEG-4 file, and the advertising content MPEG-4 file includes a video, audio, or subtitle fragment with a byte range having a beginning value represented by zero.

5. A computing device, comprising:
one or more processors and memory configured to:
receive an indication of a first request for a content presentation, the first request being generated by a first client device, the content presentation including primary content and secondary content;
generate first manifest data including first location information for fragments of the primary content and fragments of the secondary content, the first location information including first information specifying a first portion of a first uniform resource locator (URL) for a first fragment in the fragments of the secondary content, the first manifest data also including second information referencing a second URL for secondary content metadata, the first URL and the second URL representing different network locations, the secondary content metadata including per fragment metadata for specifying a second portion of the first URL; and
provide a first manifest file that includes the first manifest data to the first client device.

6. The computing device as recited in claim 5, the processors and memory being further configured to:
receive an indication of a second request for the content presentation, the second request being generated by a second client device, the content presentation including primary content and secondary content;
generate second manifest data including second location information for fragments of the primary content and fragments of the secondary content, the second location information including the first information specifying a first portion of a third URL for a second fragment in the fragments of the secondary content, the second manifest data also including the secondary content metadata including per fragment metadata for specifying a second portion of the third URL; and
provide a second manifest file that includes the second manifest data to the second client device.

7. The computing device as recited in claim 6, wherein the first manifest file and the second manifest file correspond to Dynamic Adaptive Streaming over HTTP (DASH) manifest files;
further wherein the first manifest file includes multiple periods and the second information for obtaining per fragment metadata is included in a <RepresentationIndex> markup tag included in a <SegmentBase> markup tag; and
further wherein the second manifest file includes a single period and the per fragment metadata is included in a <SegmentList> markup tag.

8. The computing device as recited in claim 5 the processors and memory being further configured to:
receive an indication of a request from the first client device for the first fragment in the fragments of the secondary content; and convert the video encoding parameter in the request for the first fragment to a different video encoding parameter.

9. The computing device as recited in claim 5, wherein the first information represents an advertising content MPEG-4 file, and the advertising content MPEG-4 file includes a video, audio, or subtitle fragment with a byte range having a beginning value represented by zero.

10. The computing device as recited in claim 5, the processors and memory being further configured to:
   determine a type of manifest being requested based on a parameter in the indication of the first request and/or an attribute of the first client device.

11. The computing device as recited in claim 5 wherein the per fragment metadata includes byte range, time range, byte offset, time offset, byte length, time duration, and/or video quality information.

12. The computing device as recited in claim 5, wherein the first URL for the first fragment and the second URL for the per fragment metadata correspond to different files.

13. The computing device as recited in claim 6, wherein the first manifest file and the second manifest file are hosted by a first edge server of a content delivery network (CDN), and/or the first manifest file and the second manifest file are generated by a first manifest server.

14. A method, comprising:
   receiving an indication of a first request for a content presentation, the first request being generated by a first client device, the content presentation including primary content and secondary content;
   generating first manifest data including first location information for fragments of the primary content and fragments of the secondary content, the first location information including first information specifying a first portion of a first uniform resource locator (URL) for a first fragment in the fragments of the secondary content, the first manifest data also including second information referencing a second URL for secondary content metadata, the first URL and the second URL representing different network locations, the secondary content metadata including per fragment metadata for specifying a second portion of the first URL; and
   providing a first manifest file that includes the first manifest data to the first client device.

15. The method as recited in claim 14, further comprising:
   receiving an indication of a second request for the content presentation, the second request being generated by a second client device, the content presentation including primary content and secondary content;
   generating second manifest data including second location information for fragments of the primary content and fragments of the secondary content, the second location information including the first information specifying a first portion of a third URL for a second fragment in the fragments of the secondary content, the second manifest data also including the secondary content metadata including per fragment metadata for specifying a second portion of the third URL; and
   providing a second manifest file that includes the second manifest data to the second client device.

16. The method as recited in claim 14, wherein the first manifest file and the second manifest file correspond to Dynamic Adaptive Streaming over HTTP (DASH) manifest files;
   further wherein the first manifest file includes multiple periods and the second information for obtaining per fragment metadata is included in a <RepresentationIndex> markup tag included in a <SegmentBase> markup tag; and
   further wherein the second manifest file includes a single period and the per fragment metadata is included in a <SegmentList> markup tag.

17. The method as recited in claim 14, further comprising:
   receiving an indication of a request from the first client device for the first fragment in the fragments of the secondary content; and
   converting the video encoding parameter in the request for the first fragment to a different video encoding parameter.

18. The method as recited in claim 14, wherein the first information represents an advertising content MPEG-4 file, and the advertising content MPEG-4 file includes a video, audio, or subtitle fragment with a byte range having a beginning value represented by zero.

19. The method as recited in claim 14, further comprising:
   determining a type of manifest being requested based on a parameter in the indication of the first request and/or an attribute of the first client device.

20. The method as recited in claim 14, further comprising:
   wherein the per fragment metadata includes byte range, time range, byte offset, time offset, byte length, time duration, and/or video quality information.

21. The method as recited in claim 14, wherein the first manifest file and the second manifest file are hosted by a first edge server of a content delivery network (CDN), and/or the first manifest file and the second manifest file are generated by a first manifest server.

22. The method as recited in claim 14, wherein the first URL for the first fragment and the second URL for the per fragment metadata correspond to different files.

* * * * *